UNITED STATES PATENT OFFICE.

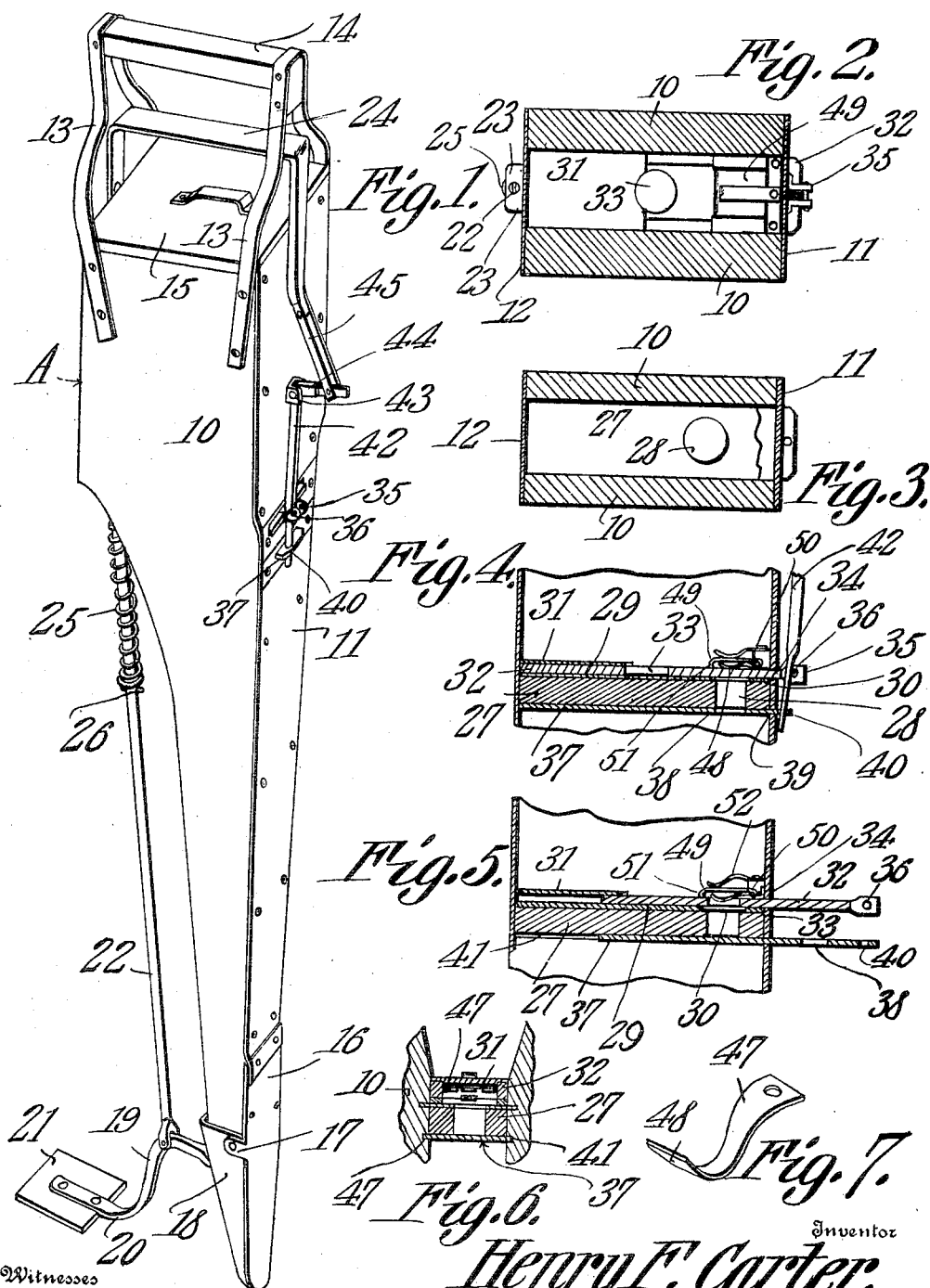

HENRY F. CARTER, OF BRADEN, OKLAHOMA.

CORN-PLANTER.

971,116. Specification of Letters Patent. Patented Sept. 27, 1910.

Application filed September 20, 1909. Serial No. 518,536.

*To all whom it may concern:*

Be it known that I, HENRY F. CARTER, a citizen of the United States, residing at Braden, in the county of Le Flore and State of Oklahoma, have invented a new and useful Corn-Planter, of which the following is a specification.

It is the object of the present invention to provide an improved construction of seed planter and the invention relates more specifically to that class of seed planters which are manipulated by hand and have lower discharge ends adapted to be thrust by hand into the soil into which the seed is to be deposited.

A further object of the invention is to provide a novel form of feed mechanism and the invention aims, in this respect to provide for positive feed of a predetermined number of seed at each operation of the device.

The feeding mechanism of the device is embodied, broadly speaking, in an apertured partition which is arranged within a seed receiving body and also slides which are disposed one above and the other beneath the partition, the slides being apertured and being so reciprocated, at each operation of the device, as to bring their apertures successively or in other words alternately into registration with the aperture in the partition, whereupon one or a predetermined number of seed will be discharged, first, into the aperture in the partition, and finally into the discharge portion of the seed receiving body. This portion of the invention embodies further means which is arranged above the upper one of the two slides just mentioned and which not only positively directs the seed into the aperture in the partition but also prevents the seed being thrown back, by the backward movement of the upper slide and further prevents the direct discharge of seed through the aperture in the upper slide and into the aperture in the partition.

Another feature of the invention resides in the arrangement of a closure for the lower end of the discharge spout which closure is arranged to swing and is actuated simultaneously with the reciprocation of the seed discharging slide.

In the accompanying drawings, Figure 1 is a perspective view of the seed planter embodying the present invention. Fig. 2 is a horizontal sectional view therethrough taken immediately above the upper one of the two slides of the planter. Fig. 3 is a view similar to Fig. 2, but taken in a plane beneath the lower one of the slides. Fig. 4 is a vertical sectional view, illustrating the seed feeding mechanism thereof in section. Fig. 5 is a view similar to Fig. 4 but illustrating the position assumed by the slides when reciprocated. Fig. 6 is a vertical sectional view through the slides and partition within the partition but taken in a plane at right angles to the planes of Figs. 4 and 5. Fig. 7 is a detail perspective view of the means provided for positively directing the seed through the aperture in the upper one of the slides and into the aperture in the partition.

In the drawings, the planter is illustrated as comprised in part of a tubular seed receiving body which is indicated in general by the reference character A and is comprised, specifically, of side walls indicated by the numeral 10, a wall 11, and a wall 12, the walls 11 and 12 being oppositely located and wall 12 being non-parallel to the wall 11 as is clearly illustrated in Fig. 1 of the drawings, throughout the major portion of its length. That portion of the wall 12 which is parallel to the wall 11 forms, in conjunction with the corresponding portions of the walls 10 and 11, the seed hopper of the planter and the remaining portion of the wall 12 together with the corresponding portion of the walls 10 and 11 afford the discharge chute of the planter. Bails 13 are secured at the upper end of the planter and are connected by a hand lever, indicated by the numeral 14, means being thus provided whereby the planter may be carried by the person using the same. A lid 15 is fitted upon the upper end of the body of the planter and closes the seed hopper therein.

It will be understood of course, that the seed to be planted are to be deposited in the hopper portion of the body of the planter and are to be properly fed by suitable means into the portion of the body below the hopper portion, or in other words into the discharge spout of the planter and in order that these seeds may be properly drilled into the ground, the planter is provided at the lower end of its discharge spout with a pivoted bill-like closure which may be readily forced into the soil and means is further provided for swinging this closure to open position thereby forcing back the soil to a slight degree and also permitting of the discharge of the seed from the seed discharge spout into the openings made in the soil for their reception.

In constructing the planter to embody the several features, a plate 16 forms a continuation of the wall 11 at the lower end thereof and projects below the lower ends of the walls 10 and 12, and this plate is formed at each side edge with an ear 17 and the closure for the lower end of the discharge pipe which closure is indicated by the numeral 18 is pivoted at its sides to these ears 17. This closure 18 includes in its structure, side walls and a connecting wall, the side walls being substantially triangular and the connecting walls being also somewhat triangular, whereby a pointed or bill-like closure is formed. It will be observed from inspection of Fig. 1 of the drawings, when this closure is in position to close the lower end of the discharge spout of the planter, a bill-like tooth will be afforded and it will further be understood that the closure 18 may be swung upon its pivot to open the lower end of the discharge and to shove back the soil into which it has been drilled. The means for swinging the closure to open and closed position will now be described. An arm 19 is secured at its inner end to the closure 18 and more specifically to the connecting wall thereof and from the closure extends outwardly and is curved at 20 downwardly and provided at its other end with a plate 21; the purpose of this plate will presently be fully explained. A rod 22 is pivoted at its lower end to the arm 19, and extends upwardly and through an apertured guide 23 upon the wall 12 of the body of the planter, and at its upper end connects pivotally with a yoke-like handle 24, which straddles the upper end of the planter body and has its spaced portions or arms extending down beside the walls 11 and 12, as is clearly illustrated in Fig. 1 of the drawings. There is disposed upon the rod 22, a spring 25, and this spring at its lower end bears against a collar or other suitable stop 26 upon the rod and at its upper end against the under side of the apertured guide 23, the tendency of the spring being to force the rod 22 in a downward direction and this tendency resulting in the closure 18 being normally held firmly in closed position. It will be understood, however, that by grasping the hand grip 14 heretofore described and by placing the fingers beneath the connecting portion of the yoke-like handle 24 and closing the hand, an upward pull will be exerted upon this handle and will be imparted to the rod 22 resulting in the closure 18 being swung to open position a greater or less degree depending upon the distance the handle is raised. Before proceeding to the description of the seed feeding mechanism of the planter it will be well to state that the plate 21 is provided for the purpose of gaging the depth to which the bill-like lower end of the planter is to be forced into the ground so that all seed will be planted at the same depth and even growth will result.

In addition to being defined by that portion of the wall 12 which is parallel to the wall 11 and the corresponding portions of the walls 10 and 11, the seed hopper of the body A of the planter includes also a bottom which is in the nature of a partition 27 arranged within the body substantially in a plane with the lower end of the before mentioned portion of the wall 12. This partition, for a purpose which will be presently explained, is provided with an opening indicated by the numeral 28 and the partition is comparatively thick. A wear plate 29 is further provided and is disposed upon the upper surface of the partition 27 and is formed with an opening 30 which registers with the opening 28 at all times. A plate 31 is fixedly mounted within the hopper of the body A above the wear plate 29 and in a plane parallel thereto and slidably disposed upon the wear plate and between the same and the plate 31 is a seed slide which is indicated by the numeral 32 and which is formed with a seed receiving opening 33, this opening being located substantially midway of the ends of the slide and one end of the slide being received through a slot 34 formed in the wall 11 and the slide at the said end being formed with spaced ears 35 connecting which is a pin 36. In addition to the slide 32, there is provided a slide 37 which latter is also formed with an opening indicated by the numeral 38 located nearer that end of the slide 37 which projects through a slot 39 in the wall 11 than the other end of the said slide, the before mentioned end of the slide 37 being formed with an aperture 40 which is in a vertical plane with the space between the ears 35 at the corresponding end of the slide 32. The slide 37 is arranged to work in grooves 41 which are formed in the side walls 10 and 11 of the body of the planter, and is located in a plane immediately beneath the partition 27 and it will be observed upon inspection of Figs. 4, 5 and 6 of the drawings. The slides 32 and 37 are to be reciprocated simultaneously and when shifted outwardly from the body A of the planter, the opening 33 in the slide 32 will come into registration with the opening 28 in the partition 27 whereby to drop a quantity of seed into the said opening 28, but moving the slide inwardly will serve to bring the opening 38 in the slide 37 into registration with the opening 28, whereby to discharge the seed from the opening 28 into the discharge chute portion of the body of the hopper, and in order that these slides may be simultaneously moved, there is provided an angle lever which is indicated by the numeral 42 and has one of its arms, namely that arm which depends from its pivot, indicated by the numeral 43, engaged loosely through the opening 40 in the slide 37 and between the ears and behind the pin 36 of the slide 32. The other arm of this angle lever, indicated by the numeral 44, extends outwardly from the wall 11 upon which the angle lever is pivoted and has pivoted to its extremity the lower ends of links 45 which in turn connect at their upper ends to the lower end of the corresponding arm of the yoke-like handle 24, it being understood when this handle is raised, the angle lever will be rocked upon its pivot whereby to shift the slides 32 and 37 outwardly and when released, the spring 25 will return the handle 24 automatically to normal position thereby shifting the slide inwardly to the normal position as illustrated in Fig. 4 of the drawings.

The slide 32 is preferably of such thickness as to receive within its openings 33 one or more of the grains to be planted at each operation of the planter and as heretofore stated means is provided for positively directing the seed from this opening into the opening 28 in the partition 27. This means is embodied in a resilient sheet metal tongue which is indicated by the numeral 47 and which is secured at one end at the wall 11 of the body of the planter and extends above the slide 32 and normally rests thereon as is shown in Fig. 4 of the drawings, the inwardly presented or free end of this tongue being curved upwardly as at 48 whereby the seed in the opening 33 may readily pass beneath the tongue. The tendency of this tongue is to spring downwardly and as the opening 33 comes into registration with the opening 28, the tongue is released and will force the seed fed therebeneath downwardly into the opening 28 and on to the slide 37. The position assumed by the tongue at such time is clearly shown in Fig. 5 of the drawings. As heretofore stated, means is also provided for preventing direct discharge of the seed through the openings 33 into the opening 28 and from preventing the seed being drawn back by the return movement of the slide 32 and this means is embodied in a plate 49 which is pivoted at one end as at 50 to the wall 11 of the body A and extends with its free end presented inwardly. This plate 49 is located directly above the slide 32 and normally rests at its free end thereon, its said end being bent under as indicated by the numeral 51 whereby to permit of the ready passage of seed beneath the said end and to position beneath the plate. A small leaf spring 52 is arranged above this plate and bears at its free end thereon whereby to hold the plate against free upward swinging movement and further to hold it in position upon the slide 32.

From the foregoing description of the invention it will be readily understood that upon the initial lift of the handle 24, one or more seed (a predetermined number) will be carried in the opening 33, in the slide 32, toward the wall 11 of the body A of the planter, owing to the reciprocation of the slide 32 and also the slide 37, in this direction. When the opening 33 comes into registration with the opening 28 in the partition 27, the seed removed by the slide 32 will drop into the opening 28 in the said partition and will rest upon the slide 37. Upon releasing the handle 24, the slide will be returned to the position shown in Fig. 4 of the drawings, in which position the opening 38 in the slide 37 will come into registration with the opening 28 in the partition 27 and the seed in the opening 38 will drop through the opening 28 into the discharge chute portion of the body of the device, and into the lower end of said chute. Upon again lifting the handle 24 this operation will be repeated and it will be understood that at each lift of the handle the closure 18 for the lower end of the seed discharge spout will be swung to open position whereby to discharge the seed previously dropped into the discharge spout into the opening made in the soil by drilling the lower end of the discharge spout thereinto.

What is claimed is:—

In a planter, a tubular body, a partition in said body formed with an aperture, a swinging closure for the lower end of the body, an apertured slide mounted beneath the partition, an apertured slide mounted above the partition, the apertures of the two slides being at all times out of vertical alinement, a spring tongue bearing upon the upper slide and adapted to spring into the aperture in the upper slide when the slide is moved in one direction, a plate pivoted to overlie the said spring tongue and having its free edge overturned and resting upon the said upper slide, a leaf spring secured above the plate and bearing thereon to hold the plate with its said edge in such engagement with the slide, the apertures in the said slides being arranged to be brought successively into registration with the aperture in the partition, an angle lever mounted upon the body and having a depending arm, the lower slide being formed with an opening and the upper slide being formed with a bifurcation, a pin extending across the bifurcation, the lower end of the said arm of the angle lever projecting through the bifurcation and opening and being confined in the said bifurcation by the said pin, a slidable hand operated member having connection with the other end of the angle lever, and connection between the said hand member and the swinging closure for the lower end of the body.

In testimony that I claim the foregoing as my own, I have hereto affixed my signature in the presence of two witnesses.

HENRY F. CARTER.

Witnesses:
Tom Ben Garrett,
James E. Wiggins.